Figure 1:
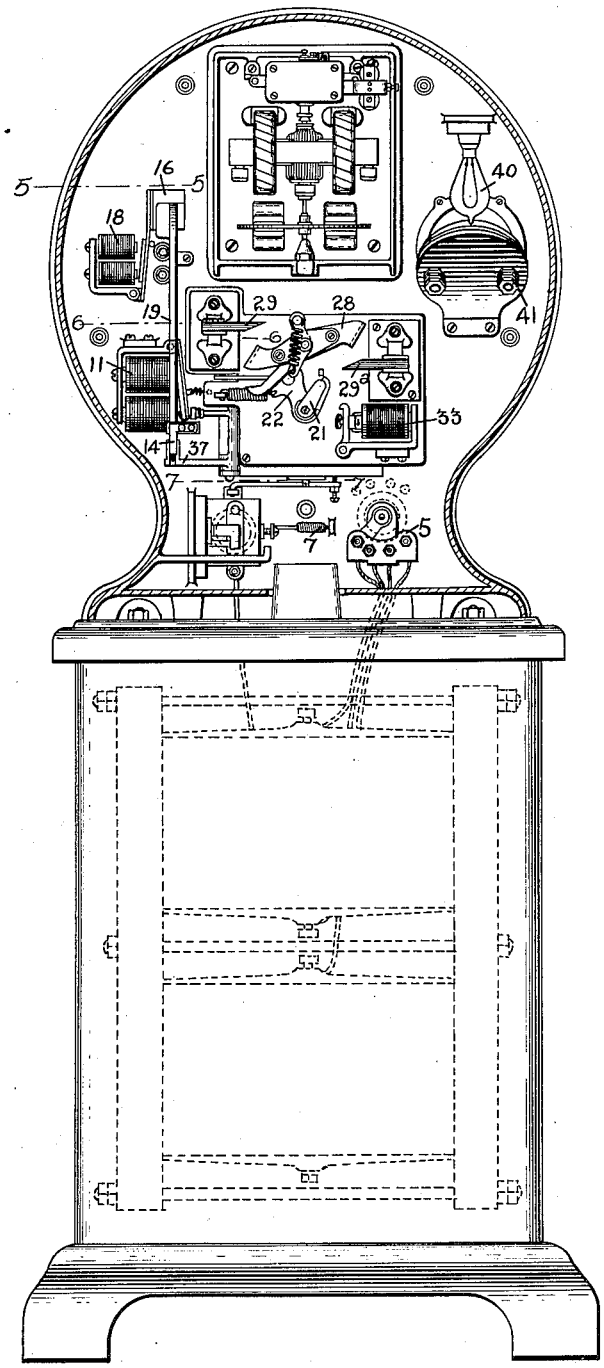

No. 798,588. PATENTED AUG. 29, 1905.
F. P. COX.
CHARGING DEVICE FOR ELECTROMOBILES.
APPLICATION FILED JULY 31, 1901.

6 SHEETS—SHEET 1.

Witnesses: Inventor
Frank P. Cox
By Albert G. Davis
Att'y.

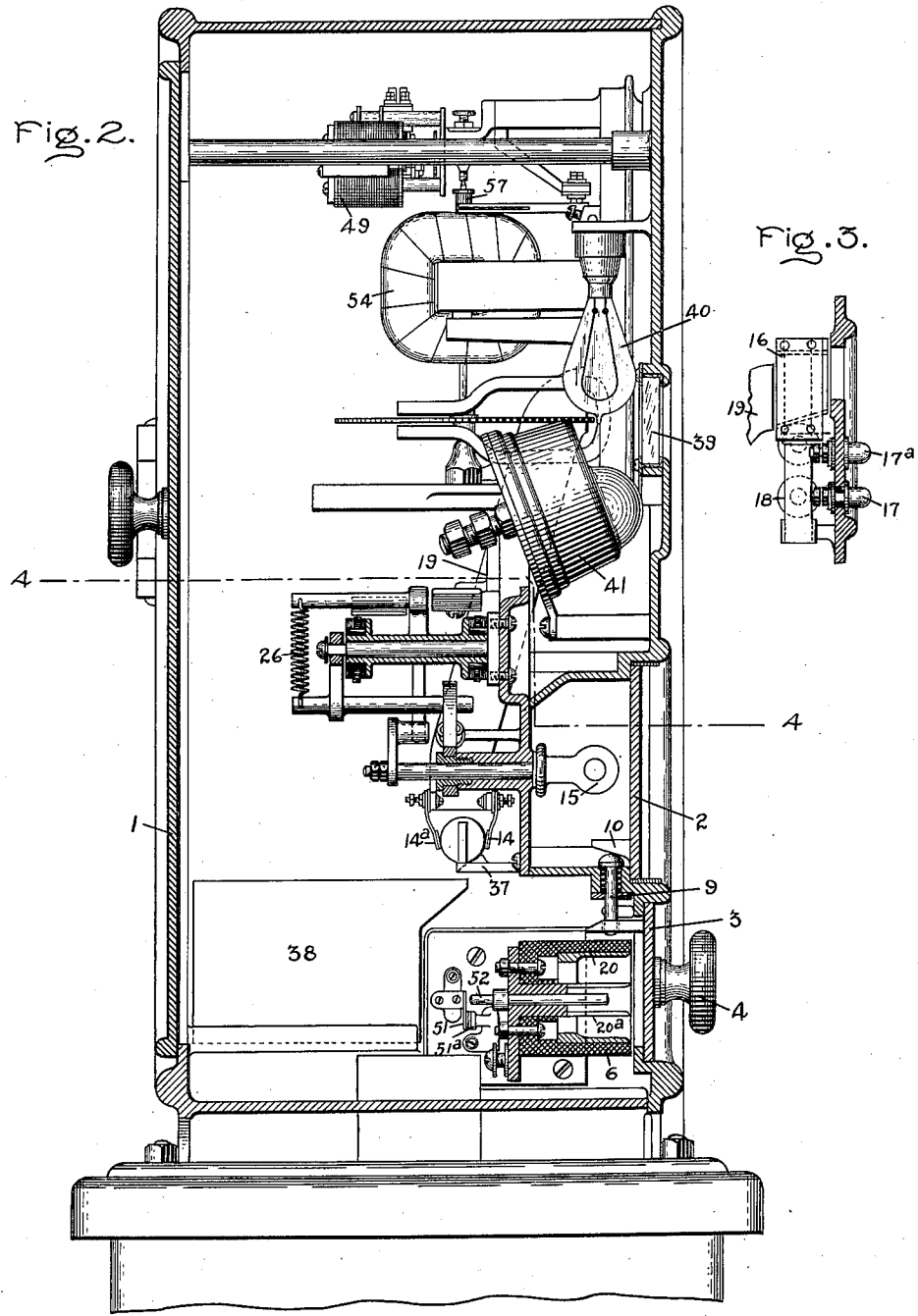

No. 798,588. PATENTED AUG. 29, 1905.
F. P. COX.
CHARGING DEVICE FOR ELECTROMOBILES.
APPLICATION FILED JULY 31, 1901.

6 SHEETS—SHEET 3.

Witnesses:
Benjamin B. Hill,
Nusel H. Emerson.

Inventor
Frank P. Cox.
By Albert G. Davis
Att'y.

No. 798,588. PATENTED AUG. 29, 1905.
F. P. COX.
CHARGING DEVICE FOR ELECTROMOBILES.
APPLICATION FILED JULY 31, 1901.

6 SHEETS—SHEET 4.

Witnesses
Benjamin B. Hill,
Michael H. Emerson,

Inventor
Frank P. Cox
By Albert G. Davis
Att'y.

No. 798,588. PATENTED AUG. 29, 1905.
F. P. COX.
CHARGING DEVICE FOR ELECTROMOBILES.
APPLICATION FILED JULY 31, 1901.

6 SHEETS—SHEET 5.

Witnesses:

Inventor
Frank P. Cox.
By Att'y.

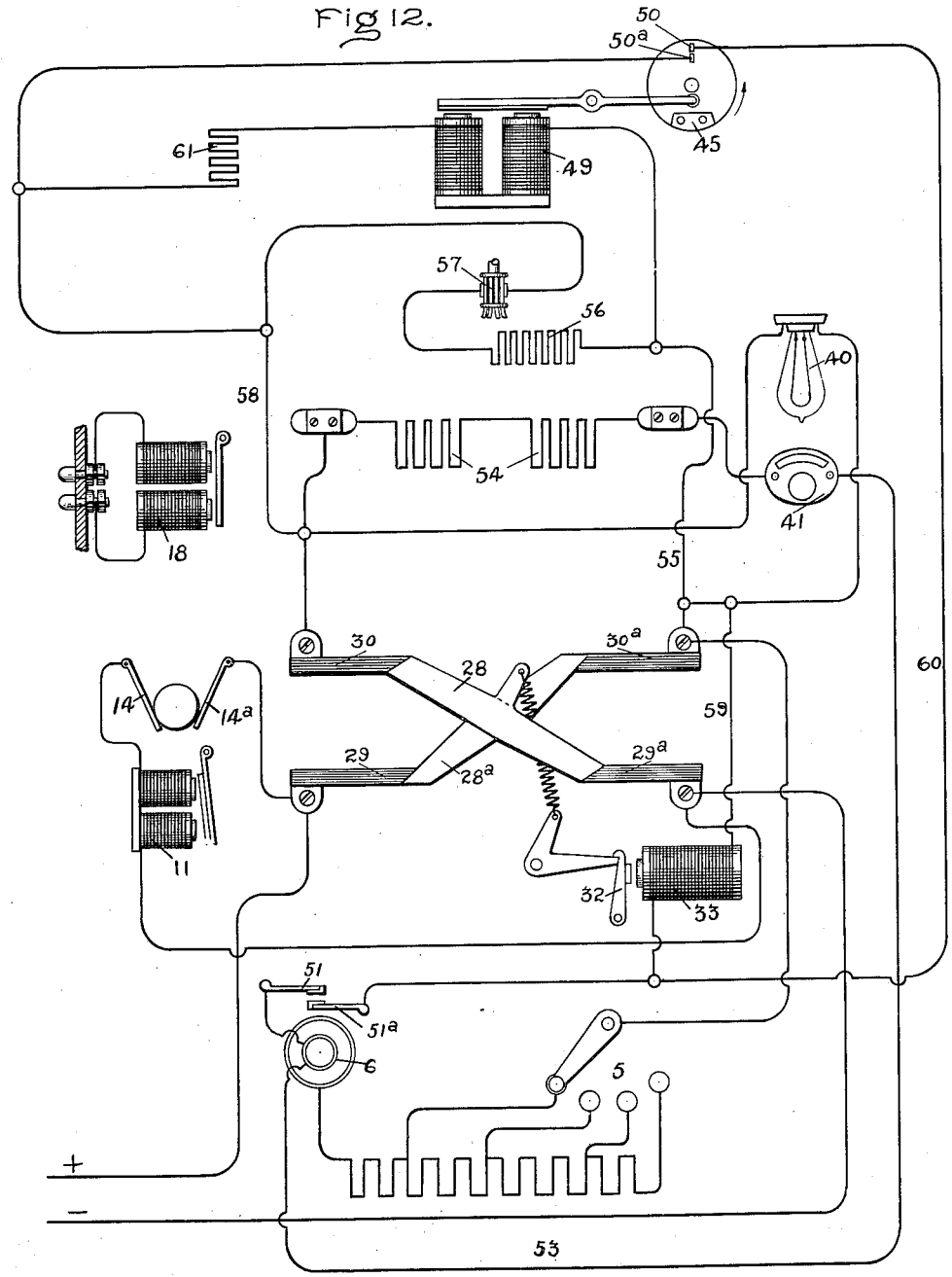

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

CHARGING DEVICE FOR ELECTROMOBILES.

No. 798,588.     Specification of Letters Patent.     Patented Aug. 29, 1905.

Application filed July 31, 1901. Serial No. 70,382.

*To all whom it may concern:*

Be it known that I, FRANK P. COX, a citizen of the United States, residing at Lynn, county of Essex, State of Massachusetts, have invented certain new and useful Improvements in Charging Devices for Electromobiles, of which the following is a specification.

This invention relates to apparatus for controlling the charging of storage batteries especially designed for use in connection with electromobiles or other similar vehicles propelled by storage batteries which have no fixed location or definite route of travel convenient to an electric supply-station.

The rapid development of self-propelled vehicles has led to the introduction of a type of charging-station for delivering energy to spent storage batteries used to propel some types of such vehicles which are placed at distributed points throughout a city or system of distribution convenient of access to such vehicles.

My improvements relate to a type of such devices described in a patent of Caryl D. Haskins, granted August 4, 1903, in which a station of the character referred to and which is commercially denominated as an "electrant" is provided having apparatus contained within a substantial casing by which a cabman may by the deposit of a coin gain access to terminals connected with a source of current-supply, the current being automatically cut off when the value of the coin or other token of value paid has been supplied.

My invention involves improvements by which a device of this character is rendered more convenient for use and reliable in action.

The device comprises a strong metal casing containing a door in the rear to which access may be had by an employee of the supply company and controlled by a key. In the front are two doors giving access to switch-operating devices and to a charging-socket into which the cabman may introduce his connecting-plug. These doors in a normal condition are both closed and locked. Access may be given to one of them—namely, that which controls the switch—by deposit of a coin or token or other evidence of value, after which the lower door may be opened and the current turned on, the switch being automatically latched in a closed position. Electrically-controlled devices automatically open the switch after the value of the coin in current has been paid, and means are provided for insuring an opening of the switch also in case the cabman leaves before having received all of the current to which he is entitled. The door governing access to the charging-socket is controlled by a spring which closes it when the charging-plug is removed, after which it is automatically locked and cannot again be opened until another prepayment has been made.

The invention involves various features of novelty, which will be more particularly hereinafter described and will be definitely indicated in the claims appended to this specification.

Figure 4:
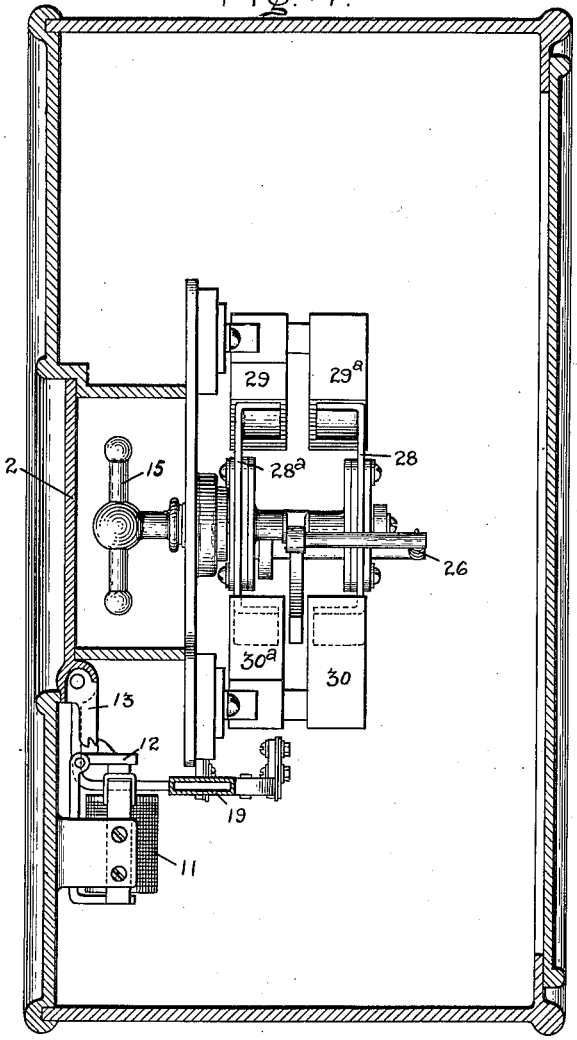
Figure 7:
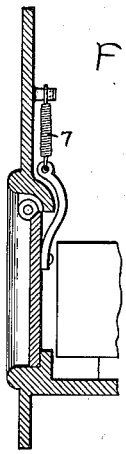
Figure 6:
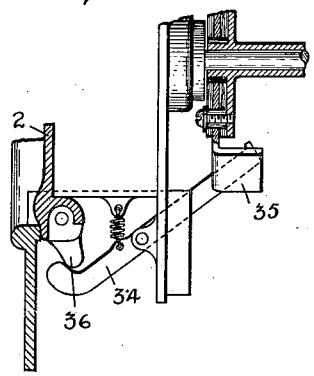
Figure 5:
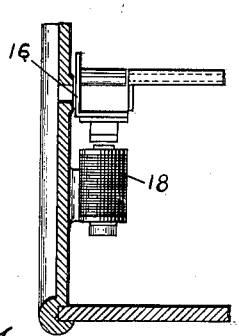
Figure 8:
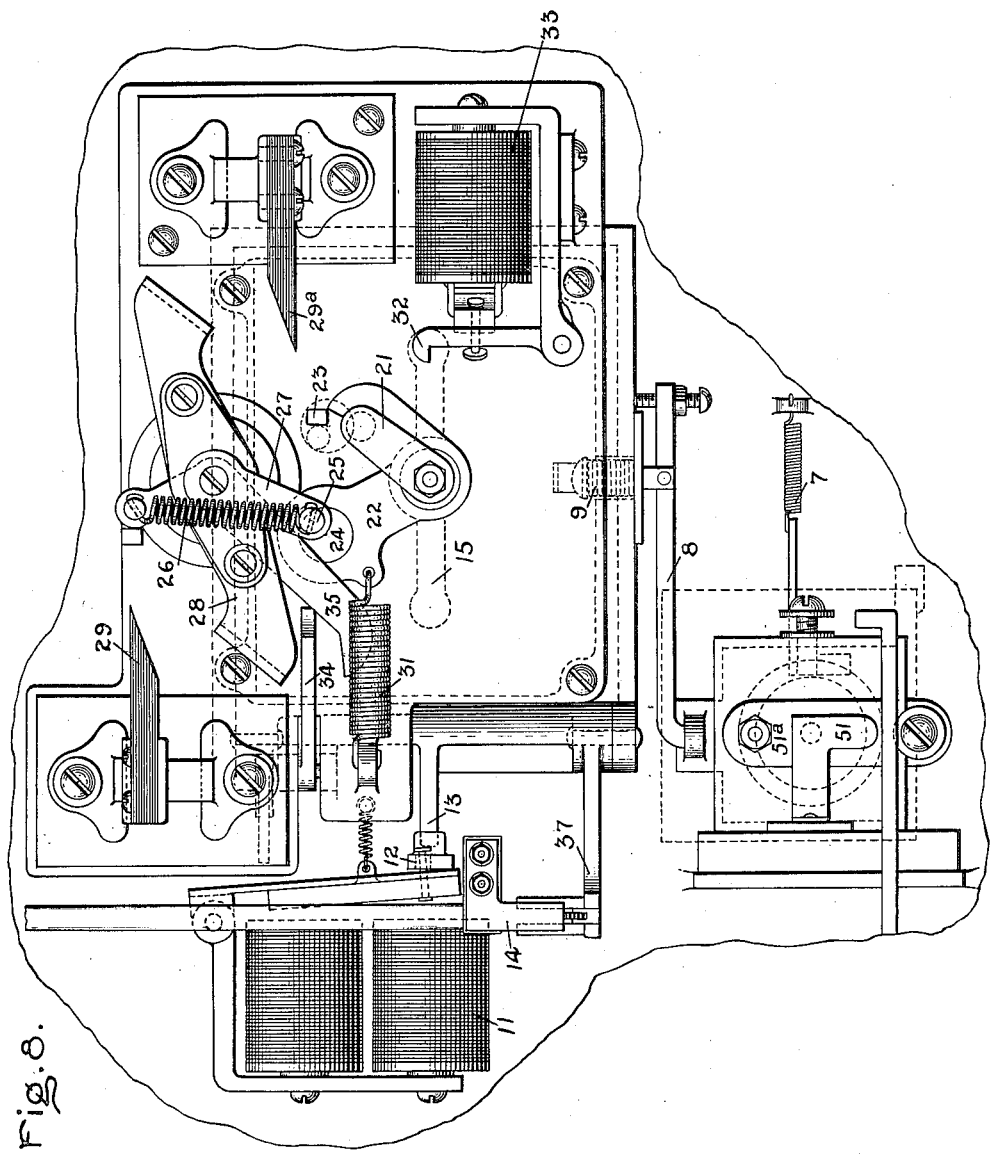
Figure 9:
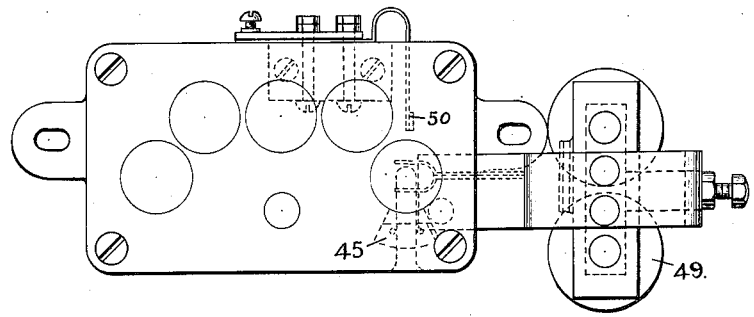
Figure 10:
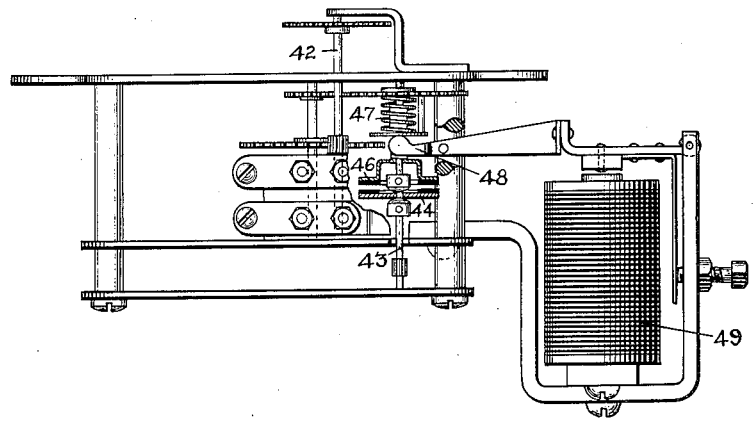
Figure 11:
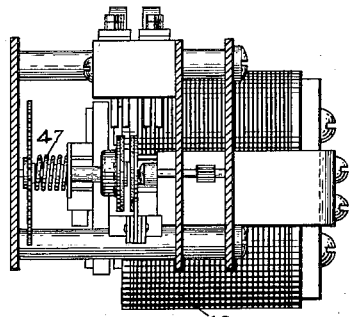

In the accompanying drawings, which illustrate the invention, Figure 1 is a front elevation, partly in vertical section, of a charging-station embodying my improvements. Fig. 2 is a partial sectional elevation at right angles to the plane indicated in Fig. 1. Fig. 3 is a sectional detail showing the arrangement of the coin-chute and its guard. Fig. 4 is a sectional view on a plane indicated by the line 4 4 of Fig. 2. Fig. 5 is a sectional detail of the coin-guard and governing-magnet on a plane at right angles to that of Fig. 3. Fig. 6 is a sectional detail of means for insuring closure of the switch-door. Fig. 7 is a sectional detail of the socket-door. Fig. 8 is an enlarged view of the switch mechanism on the same plane as Fig. 1. Figs. 9, 10, and 11 are a side elevation, top plan, and sectional end elevation of the automatic cut-off; and Fig. 12 is a diagram of the circuit connections.

The apparatus, as indicated in Fig. 1, is wholly inclosed in a substantial metal casing, as cast-iron, in the lower part of which is a switchboard or other support for the service connections, in which leads are taken to the upper part, which contains the governing apparatus. In the rear wall of this upper part is a door 1, provided with a handle and key-controlled lock, by which access may be obtained by an employee of the supply company for repairs and removal of cash. On the front side of the casing are two doors 2 3, the lower of which is provided with a handle 4, connected with which on the inside is the arm of a rheostat 5, by which the strength of current may be graduated. The upper door is provided with no handle whatever, but must be opened before access can be obtained to the charging-socket 6, contained behind the lower door. The lower door is spring-controlled, as indicated in Fig. 7, the spring 7 tending to keep it in closed position and serving to restore it to such position when the cabman's plug is withdrawn from the charging-socket. This door is normally locked by means of a latch 8, (see Fig. 8,) to which is pivotally connected a spring-pressed pin 9, extending into the path of a projection 10 (see Fig. 2) on the inside of the upper door 2.

The upper door is provided with a controlling-spring (not shown in the drawings) sufficient to just throw it ajar when released, thus permitting the cabman to get a purchase on it by means of his fingers when released. Its release is controlled by an electromagnet 11, the armature 12 of which carries a lug which lies in the path of a projection 13 (see Fig. 4) below the pivot of the door 2. The coils of this electromagnet are in circuit with two insulated contact-springs 14 14$^a$, (see Figs. 1, 2, and 12,) adapted to be bridged by and to detain a coin or token when inserted into the coin-chute, which metallically bridges the contacts and energizes the magnet 11, thereby drawing down the armature 12 and freeing the door 2, which springs ajar, and the cabman can throw it wide open and gain access to a switch-operating handle 15, contained in a recess behind the door 2.

In order to prevent others than cabmen from having access to the coin-chute, and particularly to guard against malicious interference on the part of street gamin and others, I provide a guard 16, (see Figs. 1, 3, and 5,) which normally obstructs the coin-chute and prevents the introduction of a coin, twig, or string into the coin-chute. I provide on the outside of the charging post or station two metal contacts 17 17$^a$ (see Fig. 3) in circuit with an electromagnet 18, the armature of which controls this guard. The guard normally lies in a position so that a pocket within it is in line with the coin-slot in the outer casing, as will be understood from Figs. 3 and 5. Thus a cabman may drop a coin within the pocket, and then by touching the contacts 17 17$^a$ with his charging-plug the residual energy in the battery furnishes current enough to excite the electromagnet 18, which pulls forward its armature and brings the coin-pocket of the guard in line with the coin-chute, as clearly shown in Fig. 5. The coin then drops by gravity through the chute 19 and falls upon and is detained by the spring-contacts 14 14$^a$ at its lower end, thereby exciting the electromagnet 11 and releasing the upper door. The cabman then seizes the exposed edge of the door and swings it open, thus freeing the pin 9, which springs up and releases the latch for the lower door, thus permitting access to the charging-socket 6. This socket is provided with two insulated metal terminals 20 20$^a$, adapted to coöperate with similar terminals on a plug which terminates the flexible cable leading to the storage battery on the vehicle. The cabman having inserted his plug turns the handle 15 in order to close the switch governing the supply of current. This is of the snap-switch type, the construction of which will be best understood from a comparison of Figs. 1 and 8.

Behind the casing on the same post as the handle 15 are two arms 21 22, the former of which is arrested by a stop 23, and the latter of which is provided with a slot or opening 24, through which extends a pin 25, carrying the end of a helical spring 26. The pin is supported on an arm 27. The other end of the spring is connected with a pair of bridging contacts 28 28$^a$, insulated from one another and adapted to cross-connect circuit-terminals 29 29$^a$, 30 30$^a$. (See Fig. 12). A retracting-spring 31 is connected to the lever 22 of sufficient tension to restore the switch to its normal position. On turning the handle 15 the lever 22 throws the axis of the spring 26 across the pivot of the bridging contacts and tends to rock them to a closed position. The circuit is, however, not actually closed at this moment, as I provide means for enforcing the closure of the upper door before the switching act can be completed, as will presently be described. In turning the operating-handle 15, however, a projection on the arm 21 latches into engagement with a detent 32, controlled by the armature of a release-magnet 33. Thus the switch-opening spring 31 is put under strain and latched against an immediate opening movement. Before, however, the switch is actually closed the upper door 2 must be pushed shut in order to make it absolutely certain that the cabman in leaving the charging device shall put it in proper condition for use by another cabman. This is insured by means of a stop 34, which when the door is opened lies in the path of an arm 35, rigidly connected with the bridging contacts and which obstructs a closure of the switch until the door is shut, when it is removed from the path of the arm 35 and permits the spring 26 to shift the bridging contacts into firm engagement with the terminals. The relation of these parts is seen in the detail view shown in Fig. 6, 34 representing the obstructive arm, which is spring-controlled and coöperates with a lug or projection 36 below the hinge of the door 2. Connected with the door-hinge is also an arm 37, (see Figs. 1 and 8,) which crosses the insulated contacts 14 14$^a$, which detain the coin, and is provided with two fingers between which the coin is suspended when it rests between the contacts. In opening the door these fingers sweep the coin from the jaws and permit it to drop into a cash-box 38, as will be understood from Figs. 1 and 2. Therefore on opening the door 2 after it has been released by the coin-controlled magnet 11 the coin is forced to drop into the cash-box and the electromagnet 11 is deënergized. Thus it will be evident that when the door is again closed in order to close the switch the magnet will have retracted its armature and the latter will lock the door in closed position, as will be understood from Fig. 4. The upper door is thus sealed and the cabman's plug is in its socket. The instant the switch is closed his battery begins to charge. The upper part of the casing is provided with a glazed opening 39, behind which is an incandescent lamp 40 and an ammeter 41, which shows the cabman the strength of the charging-current and permits him to graduate it by operating the handle 4, which controls the rheostat, hereinbefore described.

Included in the charging-circuit is a wattmeter which after a determinate period of operation, or rather after the delivery of a determinate quantity of current, operates the cut-off or circuit-controller, which energizes release-magnet 33 and withdraws the switch-detent, thereby permitting the restoring-spring 31 of said switch to snap it rapidly open and break the circuit. The cabman has no further control over the apparatus and can only withdraw his plug, upon which the spring-retracted door 3 will close and the apparatus be restored to its normal condition in readiness for further paid service. The mechanism by which the meter controls the release-magnet 33 is shown in Figs. 9 to 12. The worm-shaft of the meter drives a shaft 42 of the counter or register, to which is geared a shaft 43, on which is loosely pivoted a clutch-shoe 44, weighted on one side, as indicated at 45 in Fig. 12, so that when free it gravitates to the position indicated in said figure. A sliding spring-operated clutch-piece 46, splined to the shaft, is adapted to be shifted against the tension of its control-spring 47 by an arm or yoke 48, connected to the armature of an electromagnet 49, which magnet is in circuit when the switch is closed, and a battery receiving a charge, under which conditions the two clutch-jaws are forced together and the gravitative pivoted member 44 is carried around through part of a revolution during the time a battery is receiving its charge. The metal piece 45 bridges two contacts 50 50ª when the battery has received the prepaid charge and closes a circuit through the release-magnet 33, thereby automatically opening the switch and discontinuing the supply of energy. The opening of the circuit deënergizes the magnet 49, its armature is retracted, the spring clutch-jaw withdrawn, and the disk 45 drops to the position shown in Fig. 12 in readiness for a new start when the apparatus is again called into service.

In case the cabman should withdraw his plug before having received all of the energy to which he is entitled I provide means for opening the switch just as if full value had been delivered. This comprises two contacts 65 in the rear of the charging receptacle or socket, (indicated at 51 51ª in Figs. 2 and 12,) which are shifted out of engagement by a pin 52, pushed back against its spring when the cabman's plug is inserted into the socket, as is plainly evident from the figures above referred to. The wattmeter is provided with the usual potential and series windings—such, for example, as commonly employed in the Thomson recording-wattmeter, which being in general use and well known to those skilled in the art requires no detailed description. The control-circuits of this apparatus are indicated in the diagram Fig. 12. Their arrangement may be easily followed on the diagram. Assuming the switch closed, as shown in the diagram, current may enter by the plus wire, as indicated, passing when a coin is dropped into the chute through the contacts 14ª 14 by way of the coin and energizing release-magnet 11 and thence out by way of terminal 29ª and the negative lead. This releases the door and gives the cabman access to the switch-handle, which by the procedure hereinbefore described may be closed. After closure current passes by way of bridging-contact 28ª, fixed terminal 30ª to the rheostat 5, and thence through such portion of its resistance as the cabman may determine to one terminal of the charging-socket 6, thence to the battery on the cab and back to the other terminal of the charging-socket, thence by wire 53 to the ammeter 41, thence through the series coils 54 of the wattmeter, thence to the terminal 30 and across bridging-contact 28 to terminal 29ª, and out by way of the negative lead. Thus the battery is put under charge and the meter put into operation, its potential-circuit being closed across the terminals 30 30ª by way of wire 55, resistance 56, armature 57, and wire 58. In shunt relation to these terminals is the high-resistance lamp 40, which illumines the ammeter and permits the cabman to understandingly graduate his charging-current. When the plug is inserted into the socket, the spring-contacts 51 51ª are separated, as indicated in the diagram Fig. 12; but when the plug is withdrawn these two contacts engage, thereby closing the circuit through the release-magnet 33 by way of the positive terminal 30ª, wire 59, contacts 51 51ª, wire 53, ammeter, series coils of the wattmeter to negative side 30, thus withdrawing the switch-detent and automatically opening the circuit. Similarly when the wattmeter has measured the value of the paid coin contacts 50 50ª are closed, thereby closing a circuit through release-magnet 33 from positive terminal 30ª, wire 59, wire 60, through the closed contacts 50 50ª, and by wire 58 to the negative terminal 30. The clutch-magnet 49 for the meter-controlled cut-off is in permanent shunt to the terminals 30 30ª, having included a resistance 61, if deemed necessary. Consequently so long as the switch is closed the clutch is kept in action and the contact 45, carried by one member, in movement.

Having thus described my invention, what I claim as new, and desire to secure by Letters Patent of the United States, is—

1. A vending apparatus for electric energy comprising a closed casing, normally inaccessible terminals therein, coin-controlled devices governing the supply of current from said terminals, a current-indicator, and a rheostat for regulating the strength of current vended.

2. A vending apparatus for electric energy comprising a closed casing, coin-controlled devices governing the supply of current from the service-mains, a current-indicator within the casing, an electric lamp in circuit during supply of current to illumine the indicator-dial, and a normally inaccessible rheostat for regulating the strength of current vended.

3. In combination with a battery to be charged, a vending apparatus for electric energy comprising a closed casing, a switch governing connection with a source of current-supply, means for operating the switch accessible only in a prescribed way, and automatic devices for opening the switch when the battery to be charged is disconnected.

4. A vending apparatus for electric energy comprising a closed casing, a switch within the same, a normally sealed opening permitting access to the switch-operating handle, means within the casing for opening the switch, and automatic devices operated by the withdrawal of the connecting-plug to operate the switch-opening means.

5. A vending apparatus for electric energy comprising a closed casing, a switch within the same governing a supply of current to the outside of the casing, a coin-controlled normally sealed opening permitting access to the switch-operating handle, means for storing energy by operation of the handle to close the switch, detaining devices preventing the closure until the opening has been sealed, and automatic devices for opening the switch.

6. A vending apparatus for electric energy comprising a closed casing, a switch within the same governing a supply of current to the outside of the casing, a normally locked door permitting access to the switch-operating handle, a coin-controlled circuit for unlocking the door, means for opening this circuit before the switch can be operated, connections between the switch and the door enforcing closure of the latter before the switch can be closed, and means for automatically opening the switch after a period of closure.

7. The combination of a closed casing, an electric switch within the same, an operating-handle for said switch, a closing-spring strained during a movement of the handle, an opening-spring acting independently of the closing-spring also strained during movement of the handle, a stop independent of the handle for arresting the switch before full closure, means for withdrawing the stop, and a release-magnet to open the switch.

8. A vending apparatus for electric energy comprising a closed casing, a switch-closing device and charging-socket within locked doors in said casing, a magnetic release for the doors, a circuit-controller operated by a coin controlling said release, an obstruction movable by the switch-door preventing full closure of the switch until the door is closed, an arm operated by the door to open the circuit-controller, thereby permitting the release device to relock it, and a spring to close the socket-door when the connecting-plug is removed.

9. A vending apparatus for electric energy comprising a closed casing housing the operative parts, two normally locked doors covering a switch-operating handle and a charging-socket, respectively, a magnetic release for the former, and means whereby opening the former releases the latter.

10. A vending apparatus for electric energy comprising a closed casing, a charging-socket, a switch governing connection of the latter with the source of supply, and means governed by the withdrawal of the storage-battery plug for opening the switch.

11. A vending apparatus for electric energy comprising a closed casing, a charging-socket, a switch governing connection of the latter with the source of supply, and contacts in a switch-opening circuit in operative relation to the storage-battery plug when inserted in the socket, said contacts being adapted to close to insure opening of the switch when the plug is withdrawn.

12. A vending apparatus for electric energy comprising a closed casing, a charging-socket, a switch governing connection of the supply-mains and said socket, a wheel-train operated when current is passing, a circuit-controller for a switch-opening circuit adapted to return when free to an initial position, and a clutch connecting it with the wheel-train when current is passing, adapted to open the switch after a determinate movement of the wheel-train.

13. A vending apparatus for electric energy comprising a closed casing, a charging-socket, a switch governing connection of the supply-mains and the socket, a meter operated by the current, a circuit-controller for a switch-opening circuit operated by the meter after a definite amount of energy has passed and adapted to return when free to a determinate position, and a magnetically-operated clutch to connect the circuit-controller with the meter when the circuit is closed through the meter.

14. A vending apparatus for electric energy comprising a casing having a coin-slot therein, a coin-chute within the casing out of alinement with the slot, a coin-pocket movable between the slot and chute, and an electromagnet energized from outside of the casing for moving said coin-pocket.

15. A vending apparatus for electric energy comprising a closed casing, a switch within the same governing the supply of current to the outside of the casing, a normally locked door permitting access to the switch-operating handle, a coin-controlled circuit for unlocking the door, and means for opening said circuit operated by opening said door.

16. A vending apparatus for electric energy comprising a closed casing, a switch within the same governing the supply of current to the outside of the casing, a normally locked door permitting access to the switch-operating handle, means for unlocking the door, and connections between the switch and the door enforcing closure of the latter before the switch can be closed.

In witness whereof I have hereunto set my hand this 29th day of July, 1901.

FRANK P. COX.

Witnesses:
DUGALD McK. McKILLOP,
JOHN J. WALKER.